2,714,593
DIHYDROPYRROLO-(3.2-c) QUINOLINE DERIVATIVES

Hans Ulrich Hörlein, Hans Andersag and Helmut Timmler, Wuppertal-Elberfeld, Germany, assignors to Schenley Industries, Inc., New York, N. Y., a corporation of Delaware No Drawing. Application April 28, 1953, Serial No. 351,752

Claims priority, application Germany May 26, 1952

The portion of the term of the patent subsequent to October 5, 1971, has been dedicated to the public 7 Claims. (Cl. 260—287)

This invention relates generally to the synthesis of organic chemical compounds and, more particularly, it relates to certain novel derivatives of 1-methyl-2,3-dihydropyrrolo-(3.2-c) quinoline useful in chemotherapy, especially in treatment of malaria and amoebiasis.

The novel compounds of this invention are represented by the formula:

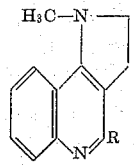

wherein R is of the group consisting of N-methylcarbamyl, carboxy and hydrogen.

The products of this invention may be obtained readily by simple chemical reactions performed upon known starting materials. For example, α-butyrolactone and a dialkyl oxalate, such as diethyl oxalate, are reacted in an alcoholic sodium ethoxide solution to yield the product represented by the formula:

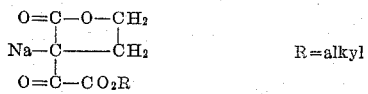   R=alkyl which is condensed with aniline to yield a Schiff's base type product represented by the formula:

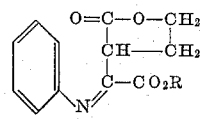

which upon treatment with a phosphorus halide yields a 2-carbalkoxy-3-β-haloethyl-4-halo-quinoline, represented by the formula:

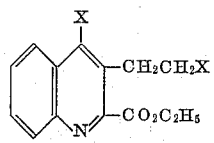

X=halogen.

When this product is reacted with methylamine, the desired 1-methyl-4-N-methylcarbamyl-2,3-dihydropyrrolo-(3.2-c)quinoline is obtained. Upon boiling this N-methylcarbamyl product with alcoholic alkali, the alkali salt of 1-methyl-4-carboxy-2,3-dihydropyrrollo-(3.2-c)-quinoline is obtained, and this acid is obtained from the salt solution by saturating it with carbon dioxide. When heated at its melting point, 1-methyl-4-carboxy-2,3-dihydropyrrolo-(3.2-c)quinoline decomposes with liberation of carbon dioxide, yielding 1-methyl-2,3-dihydropyrrolo-(3.2-c)quinoline.

The following illustrative examples indicate in detail the preferred methods for obtaining the products of this invention.

Example 1

Synthesis of the compound represented by the formula:

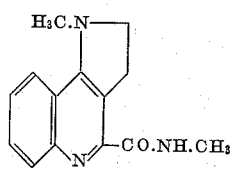

Gaseous hydrogen chloride is introduced into a suspension of about 208 grams of the sodium salt of the oxalic acid ester of α-butyrolactone in a mixture of 1000 cubic centimeters of chloroform and 93 grams of aniline until the mixture is saturated with the gas, then the mixture is boiled for 15 hours, during which time the water formed during the reaction is removed. After the reaction mixture has cooled, the sodium chloride formed as a by-product is dissolved by shaking the chloroform solution with water, then the chloroform solution is separated and washed repeatedly with water and finally with sodium carbonate solution. The chloroform solution of the aniline-lactone-ester condensation product is dried over anhydrous sodium sulfate, the solvent is distilled off on a water bath and the residue, dissolved in 400 cubic centimeters of xylene, is treated with 400 grams of phosphorus oxychloride. The residue of this mixture, which contains 2-carbethyoxy-3-β-chloroethyl-4-chloro-quinoline yields a solution in methylene chloride that is a dark oil. The crude product is melted with 150 grams of phenol, reacted with gaseous methylamine, the reaction product is dissolved in methylene chloride, the phenol is extracted with dilute sodium hydroxide solution, and the methylene chloride is distilled off, finishing finally in vacuo. The residue is twice reprecipitated, with the addition of carbon, from its solution in dilute hydrochloric acid by addition of dilute sodium hydroxide solution. The solid brown yellow base compound thus obtained is dried, dissolved in acetone and by addition of hydrochloric acid, the hydrochloride of 1-methyl-4-N-methylcarbamyl-2,3-dihydropyrrolo - (3.2-c)quinoline is precipitated. After being recrystallized from a mixture of alcohol and acetone, the purified product has a melting point of over 290° C.

Example 2

Synthesis of the compound represented by the formula:

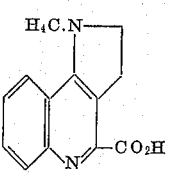

Crude 1-methyl-4-N-methylcarbamyl - 2,3 - dihydropyrrolo-(3.2-c)quinoline, which may be obtained as described in Example 1, is boiled with an excess of alcoholic sodium hydroxide solution for about 4 hours. This treatment yields a solution containing the sodium salt of the acid of the last formula set forth above. The acid is obtained by cooling the solution of the salt, cooling the solution containing the sodium salt, filtering it under suction, washing the residue with alcohol, drying it, dissolving it in water, clearing it with animal charcoal and introducing carbon dioxide to cause precipitation of 1-methyl-4-carboxy-2,3-dihydropyrrolo-(3.2-c)quinoline. Its melting point is 273–275° C.

*Example 3*

Synthesis of the compound represented by the formula:

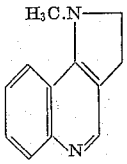

Crude 1-methyl-4-carboxy-2,3 - dihydropyrrolo - (3.2-c)-quinoline, which may be prepared as described in Example 2, is heated at its melting point until evolution of carbon dioxide ceases. The product so obtained is 1-methyl-2,3-dihydropyrrolo-(3.2-c)quinoline, being represented by the formula last set forth above, has a boiling point of 180° to 183° C. at a pressure of 3 millimeters of mercury and, after being purified by recrystallization from ligroin, its melting point is 108° to 109° C.

Attention is directed to our copending U. S. application Serial Nos. 351,751 and 351,753, also filed on April 28, 1953, wherein we have described and claimed other dihydropyrrolo-(3.2-c)quinoline derivatives and processes for their production.

Having thus described the subject matter of this invention, what it is desired to secure by Letters Patent is:

1. As a new chemical compound, a substance chosen from the group consisting of compounds represented by the formula:

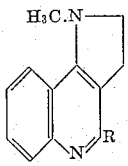

wherein R is chosen from the group consisting of hydrogen, carboxy and N-methylcarbamyl.

2. As a new chemical compound, 1-methyl-2,3-dihydropyrrolo-(3.2-c)quinoline.

3. As a new chemical compound, 1-methyl-4-carboxy-2,3-dihydropyrrolo-(3.2-c)quinoline.

4. As a new chemical compound, 1-methyl-4-N-methylcarbamyl-2,3-dihydropyrrolo-(3.2-c)quinoline.

5. Process for making 1-methyl-4-N-methylcarbamyl-2,3-dihydroxypyrrolo - (3.2-c)quinoline that comprises forming a Schiff's base type product by condensing an oxalic acid alkyl ester of α-butyrolactone and aniline by boiling the reactants together in an organic solvent medium; treating this Schiff's base type compound with a phosphorus oxyhalide and recovering, as the reaction product, 2-carbalkoxy-3-β-haloethyl-4-halo-quinoline from the reaction mixture; reacting this reaction product with methylamine at an elevated temperature in an organic solvent medium, and recovering from the reaction mixture the desired product, 1-methyl-4-N-methylcarbamyl-2,3-dihydropyrrolo-(3.2-c)quinoline.

6. A process as defined in claim 5 further characterized in that the 1-methyl-4-N-methylcarbamyl-2,3-dihydropyrrolo-(3.2-c)quinoline is saponified by treatment with boiling alcoholic alkali to yield the alkali salt of 1-methyl-4-carboxy-2,3-dihydropyrrolo-(3.2-c)quinoline, and that this alkali salt, in aqueous solution, is treated with carbon dioxide to yield the corresponding acid, 1-methyl-4-carboxy-2,3-dihydropyrrolo-(3.2-c)quinoline, which is recovered from the reaction mixture.

7. A process as defined in claim 6 further characterized in that the 1-methyl-4-carboxy-2,3-dihydropyrrolo-(3.2-c)quinoline is heated at its melting point until carbon dioxide evolution ceases, then 1-methyl-2,3-dihydropyrrolo-(3.2-c)quinoline is recovered from the residue.

References Cited in the file of this patent
UNITED STATES PATENTS

| | | |
|---|---|---|
| 2,196,776 | McNally | Apr. 9, 1940 |
| 2,650,229 | Timmler et al. | Aug. 25, 1953 |